United States Patent
Cho

(10) Patent No.: US 7,079,949 B2
(45) Date of Patent: Jul. 18, 2006

(54) SYSTEMS AND METHODS FOR NAVIGATING BASED ON GPS AND TERRESTRIAL LOCATION INFORMATION

(75) Inventor: Dong-sik Cho, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 51 days.

(21) Appl. No.: 10/689,434

(22) Filed: Oct. 20, 2003

(65) Prior Publication Data
US 2004/0138812 A1    Jul. 15, 2004

(30) Foreign Application Priority Data
Jan. 14, 2003   (KR) .................... 10-2003-0002471

(51) Int. Cl.
   *G01C 21/26*   (2006.01)
(52) U.S. Cl. .................. 701/213; 342/357.12
(58) Field of Classification Search ........ 701/200–202, 701/207–209, 211, 213–215; 340/988; 342/357.06, 342/357.09, 357.12
See application file for complete search history.

(56) References Cited
U.S. PATENT DOCUMENTS
6,735,518 B1 * 5/2004 Kim ........................ 701/209

FOREIGN PATENT DOCUMENTS
KR    1999-71029    5/2005

OTHER PUBLICATIONS

Scientific Component: NMEA 0183 and GPS: Decoding the NMEA 0183 standard in your GPS software project (from web site as of Sep. 30, 2005).*
NMEA (National Marine Electronics Association) 0183 Protocol (from web site marimsys as of Sep. 30, 2005).*
Notice to File a Response/Amendment to the Examination Report for Korean Patent Application No. 10-2003-0002471 mailed on May 30, 2005.

* cited by examiner

*Primary Examiner*—Yonel Beaulieu
(74) *Attorney, Agent, or Firm*—Myers Bigel Sibley & Sajovec, PA

(57) ABSTRACT

Location information is received from a terrestrial location indicator device. The location information is based on location of the terrestrial location indicator device. Location information is also determined from a GPS satellite signal. The location of a device relative to an object in a map is determined based on the location information from the terrestrial location indicator device and the location information from the GPS satellite signal. The location information from the terrestrial location indicator device may be used to distinguish the device location relative to at least two adjacent objects, such as roads, in a map.

17 Claims, 3 Drawing Sheets

SYSTEMS AND METHODS FOR NAVIGATING BASED ON GPS AND TERRESTRIAL LOCATION INFORMATION

RELATED APPLICATION

This U.S. nonprovisional patent application claims priority under 35 U.S.C. § 119 to Korean Patent Application 10-2003-0002471 filed on Jan. 14, 2003, the entire contents of which is hereby incorporated by reference.

FIELD OF THE INVENTION

The present invention relates to systems and methods for navigating and, more particularly, to system and methods for navigating based on a global positioning system (GPS) signal.

BACKGROUND OF THE INVENTION

Some navigation systems use information that is received from a Global Positioning System (GPS) to display a moving object on a map. Such navigation systems may be used in, for example, ships, airplanes, and land vehicles, to determine location and velocity and/or to determine a traveled route. A navigation system may determine its latitude, longitude, altitude and the like from a radio signal that it receives from a plurality of satellites belonging to the GPS system, and may visually display the current location of the navigation system as a moving object on a map.

A navigation system in a land vehicle may display a map that shows roads with corresponding identifiers along with navigation information that may be used while driving, such as the vehicle's direction of travel, distance to a defined destination, current speed, a route traveled on the roads, and a route along the roads to the defined destination. Navigating with the displayed information may be difficult when, for example, roads are adjacent (i.e., geographically close) to each other, such as where a road splits and at road intersections. For example, a navigation system may incorrectly indicate that it is traveling on one road when it is actually traveling on another adjacent road. The navigation system may eventually correct its error by, for example, abruptly moving the displayed vehicle to the correct road. A driver may also have difficulty determining which of several adjacent roads should be taken, or has been taken, when the navigation system has insufficient certainty in its location, such as due to partial or complete blockage of the GPS signals, and/or when the level of detail that is displayed in the map (e.g., road names) is insufficient for such decisions.

SUMMARY OF THE INVENTION

Location information is received from a terrestrial location indicator device. The location information is based on location of the location indicator device. Location information is also determined from a GPS satellite signal. The location of a device relative to an object in a map is determined based on the location information from the location indicator device and the location information from the GPS satellite signal. The location information from the terrestrial location indicator device may be used to distinguish the location of a device relative to at least two adjacent objects, such as roads, in the map. Location indicator devices may be located near road branches and intersections to provide nearby vehicles with more accurate location information. Navigation systems in the vehicles may use the information to more accurately determine which of several alternate routes should be taken, and/or to determine and display which route has been taken.

DESCRIPTION OF THE PREFERRED EMBODIMENT

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and mobile terminals according to embodiments of the invention. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

For purposes of illustration only, some embodiments of the present invention reference the United States Global Positioning Satellite (GPS) system, however the invention is also applicable to similar satellite positioning systems, such as the Russian Glonass system. The term "GPS" used herein includes such alternative satellite positioning systems, including the Russian Glonass system. Thus, the term "GPS signals" includes signals from such alternative satellite positioning systems.

Figure 1:
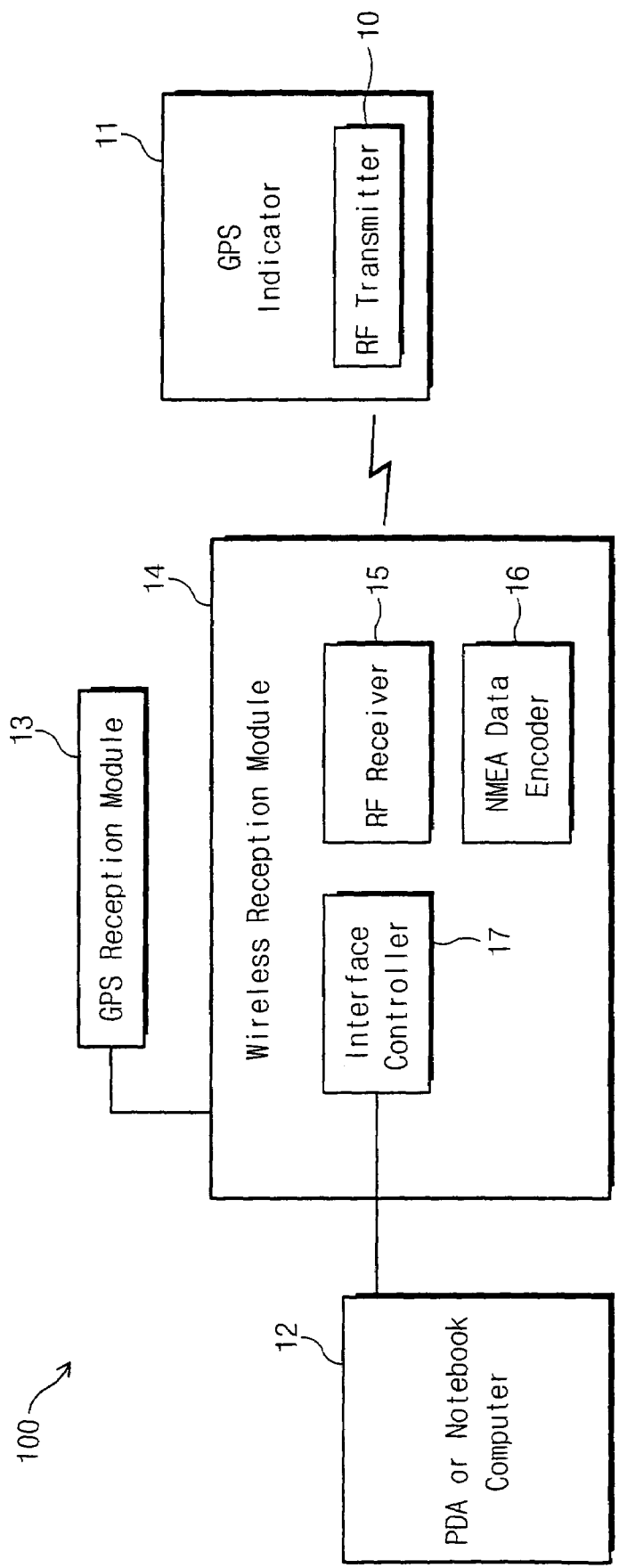
FIG. 1 shows a navigation system according to various embodiments of the present invention.

A navigation system 100 according to various embodiments of the present invention is now described below with reference to FIG. 1. The navigation system 100 includes a GPS indicator 11, an image display device 12, a GPS reception module 13, and a wireless reception module 14. The GPS indicator 11 is a ground based device that has a RF transmitter 10 that transmits location information that is based on the location of the GPS indicator 11, such as absolute coordinate values, through a terrestrial communication link. The GPS indicator 11 may, for example, transmit the location information through a wireless local area network (WLAN) link, cellular communication link, Bluetooth communication link, and/or via a signal that is similar to a traditional satellite-sourced GPS signal modulated on an L-band carrier signal, and which is generally synchronized with GPS time. The location information may include latitude (N or S), longitude (E or W), and/or altitude, and may be represented as decimal values, binary values, and/or ASCII characters, and may be represented by a minimum amount of such information.

The image display device 12, the GPS reception module 13, and the wireless reception module 14 may be used in a vehicle to display the location of the vehicle on a map of roads. The image display device 12 may be, for example, a notebook computer, a cellular phone and/or a personal digital assistant (PDA). The GPS reception module 13 determines its location from a satellite signal, and may convert the location information into NMEA (National Marine Electronics Association) 0183 type position data. The GPS reception module 13 communicates the location information, such as NMEA 0183 type data, to the wireless reception module 14. The wireless reception module 14 includes an RF receiver 15, an NMEA data encoder 16, and an interface controller 17. The RF receiver 15 receives location information, such as absolute coordinate values, from the GPS indicator 11 through a terrestrial communication link. The NMEA data encoder 16 converts the location information from the GPS indicator 11 into NMEA 0183 type data.

The wireless reception module 14 is configured to determine its location using the location information from the GPS reception module 13 and/or the GPS indicator 11. For example, the GPS indicator 11 may be a land based geographically fixed device that accurately knows its location. Consequently, the location information from the GPS indicator 11 can be more accurate than that generated by the GPS reception module 13, especially when the GPS signal is at least partially obscured, such as by a tunnel, buildings, or trees. Thus, in some embodiments of the present invention, when location information is received from the GPS indicator 11, the wireless reception module 14 may determine its location using only the location information from the GPS indicator 11, and/or may determine its location using a combination of the location information from the GPS indicator 11 and from the GPS reception module 13. The interface controller 17 communicates the location information to the image display device 12 through, for example, a serial port or an USB port where it is displayed on a map.

The wireless reception module 14 and the display device 12 may thereby determine location relative to an object in the map based on the location information. For example, the map may include roads, and the location information may be used to display location of a vehicle relative to the roads. The location information from the GPS indicator 11 may be used to more accurately distinguish vehicle location relative to two or more adjacent roads, such as where a road branches into two or more roads and/or an intersection of two or more roads. Accordingly, a driver may be able to more accurately determine the location of the vehicle on a map of roads, and/or may be able to more precisely determine how to navigate the vehicle when several alternate roads may be taken, such as when a road branches or intersects with other roads.

GPS indicators 11 may be located near where roads branch and/or intersect other roads to provide accurate position information to a vehicle. For example, a GPS indicator 11 may be located where roads are geographically close and/or where a GPS signal may be obscured. The GPS indicator 11 may be told its location (e.g., preprogrammed location), and/or may determine its location via, for example, a GPS signal.

The GPS indicator 11 may communicate via a terrestrial communication link with sufficient strength so that the position information may be received and processed by the wireless reception module 14 and displayed by the image display device 12, while providing sufficient time for a driver to decide which of several possible roads should be taken, or has been taken. The location and communication range of the GPS indicator 11 may be determined by the directivity of the transmission (e.g., omnidirection or directional), expected vehicle speed, expected delay between reception and display of the location information, and expected reaction time of a driver. The location and communication range of the GPS indicator 11 may be sufficient so that a driver has sufficient time to observe the location of the vehicle on the map relative to adjacent roads and to make a timely decision as to how to navigate relative to the roads.

Figure 2:
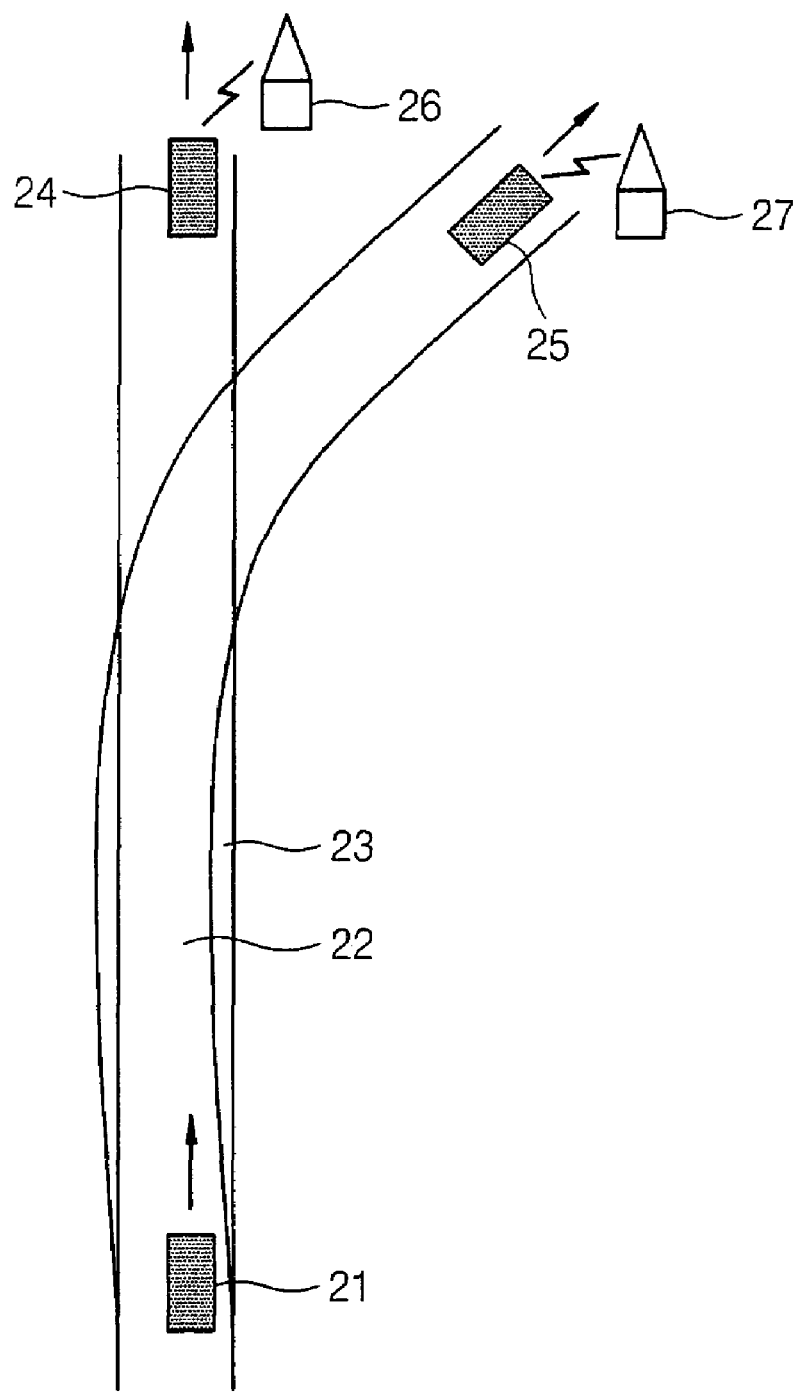
FIG. 2 shows a navigation system according to some embodiments of the present invention.

An example navigation system according to some embodiments of the present invention is illustrated in FIG. 2. Referring to FIG. 2, a vehicle 21 is traveling on a road that branches, with one road path 23 continuing straight (e.g., vehicle position 24) and another road path 22 branching right (e.g., vehicle position 25). Accordingly, a vehicle navigation system may need to distinguish between the two paths 22 and 23 depending upon the route taken by the vehicle. Two GPS indicators 26 and 27 are located near the branch in the road, adjacent to the road paths 22 and 23. Depending upon which of the two paths 22 and 23 is taken by the vehicle, the vehicle navigation system become within the communication range from one of the two GPS indicators 26 and 27 and receives location information there from. The transmission range of the GPS indicators 26 and 27 may be sufficiently short so that the vehicle navigation system receives location information from only one of the two GPS indicators 26 and 27. The navigation system then determines its location relative to the roads and may correctly display on the map which of the two paths 22 and 23 is being traveled by the vehicle.

Figure 3:
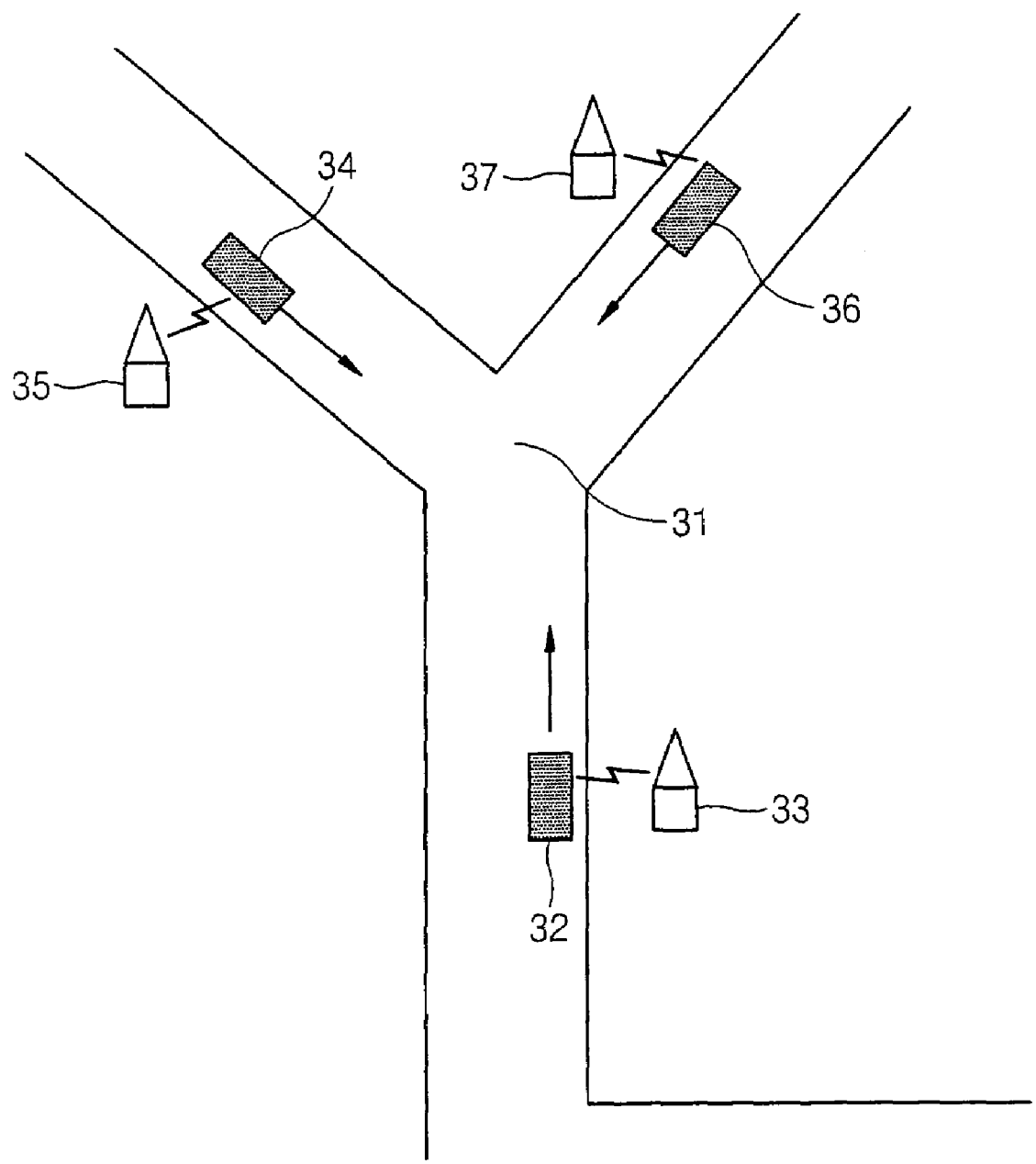
FIG. 3 shows another navigation system according to some embodiments the present invention.

Another navigation system according to some embodiments of the present invention is illustrated in FIG. 3. Referring to FIG. 3, when vehicles 32, 34, and 36 reach the three way intersection 31, navigation systems in the vehicles 32, 34, and 36, may be uncertain as to which road should be taken to continue a route, and/or which road has been taken. Such uncertainty may be due to, for example, close proximity of the roads and/or an obscured or unavailable GPS signal. GPS indicators 33, 35, and 37 are each located adjacent to one of the roads near the three-way intersection. The GPS indicators 33, 35, and 37 each transmit their location information over a short-range terrestrial communication link that may be used by navigation systems in the vehicles 32, 34, and 36 to determine and display vehicle positions relative to the roads. The transmission range of the GPS indicators 33, 35, and 37 may be sufficiently short so that navigation systems in the vehicles 32, 34, and 36 receive position information from only an adjacent one of the GPS indicators 33, 35, and 37. Drivers may thereby navigate the vehicles with more accuracy relative to the intersection 31.

Other modifications and variations to the invention will be apparent to a person skilled in the art from the foregoing disclosure. Thus, while only certain embodiment of the invention has been specifically described herein, it will be apparent that numerous modifications may be made thereto without departing from the spirit and scope of the invention.

What is claimed is:

1. A navigation system comprising:
   a location indicator device that is configured to transmit location information through a terrestrial wireless air communication link, wherein the location indicator device is geographically fixed and the location information is based on location of the location indicator device;
   a GPS reception module that is configured to determine location information based on a GPS satellite signal and to output NMEA 0183 type location information; and
   a wireless reception module that is configured to receive the location information from the location indicator device over the terrestrial wireless air communication link and to determine its location relative to an object in a map based on the location information from the location indicator device and the GPS reception module, and wherein the GPS reception module and the wireless reception module are co-located and are movable with respect to the geographically fixed location indicator device.

2. The navigation system of claim 1, further comprising an image display device that is configured to display a map of roads, and is configured to display location relative to the roads.

3. The navigation system of claim 1, wherein the wireless reception module is configured to determine its location relative to a road in the map based on selectively using the location information from the location indicator device or the location information from the GPS reception module.

4. The navigation system of claim 1, wherein the wireless reception module is configured to determine its location relative to a road in the map by combining the location information from the location indicator device and the GPS reception module.

5. The navigation system of claim 1, wherein the wireless reception module is configured to distinguish its location relative to at least two adjacent objects in the map based on the location information from the location indicator device.

6. The navigation system of claim 1, wherein the wireless reception module is configured to distinguish its location relative to at least two adjacent roads in the map based on the location information from the location indicator device.

7. The navigation system of claim 1, wherein the location indicator device is located adjacent to where a road branches into two or more roads.

8. The navigation system of claim 1, wherein the location indicator device is located adjacent to an intersection of two or more roads.

9. The navigation system of claim 1, wherein the location indicator device is configured to transmit location information that comprises latitude and longitude values.

10. A navigation system comprising:
    a location indicator device that is configured to transmit location information through a terrestrial wireless air communication link, wherein the location indicator device is geographically fixed and the location information is based on location of the location indicator device;
    a GPS reception module that is configured to determine location information based on a GPS satellite signal and to output NMEA 0183 type location information; and
    a wireless reception module that is configured to receive the location information from the location indicator device over the terrestrial wireless air communication link and to determine its location relative to an object in a map based on the location information from the location indicator device and the GPS reception module, and wherein the GPS reception module and the wireless reception module are co-located and are movable with respect to the geographically fixed location indicator device; and
    an image display device that is configured to display location of the GPS reception module on a map, and wherein the wireless reception module comprises:
    a RF receiver that is configured to receive location information from the location indicator device through the terrestrial communication link;
    a NMEA data encoder that is configured to convert the location information received from the location indicator device to NMEA 0183 type location values; and
    an interface controller that is configured to communicate at least one of the NMEA 0183 type location values and the location information from the GPS reception module to the image display device.

11. The navigation system of claim 10, wherein the interface controller is configured to selectively communicate the NMEA 0183 type location values or the location information from the GPS reception module to the image display device.

12. The navigation system of claim 1, further comprising an image display device that is configured to display location of the GPS reception module on a map, wherein the image display device is at least one of a notebook computer, a cellular phone and a personal digital assistant (PDA).

13. A method of navigating, comprising:
    receiving location information from a geographically fixed terrestrial location indicator device over a terrestrial wireless air communication link, wherein the location information is based on location of the terrestrial location indicator device that comprises NMEA 0183 type information;
    determining location information for a wireless reception module from a GPS satellite signal; and
    determining location of the wireless reception module relative to an object in a map based on the location information from the terrestrial location indicator device and the location information from the GPS satellite signal.

14. The method of claim 13, further comprising determining location relative to the object in the map based on selectively using the location information from the terrestrial location indicator device or the location information from the GPS satellite signal.

15. The method of claim 13, further comprising determining location relative to the object in the map by combining the location information from the terrestrial location indicator device and the location information from the GPS satellite signal.

16. The method of claim 13, further comprising distinguishing location of a device relative to at least two adjacent objects in the map based on the location information from the terrestrial location indicator device.

17. The method of claim 13, further comprising distinguishing location of a device relative to at least two adjacent roads in the map based on the location information from the terrestrial location indicator device.

* * * * *